UNITED STATES PATENT OFFICE.

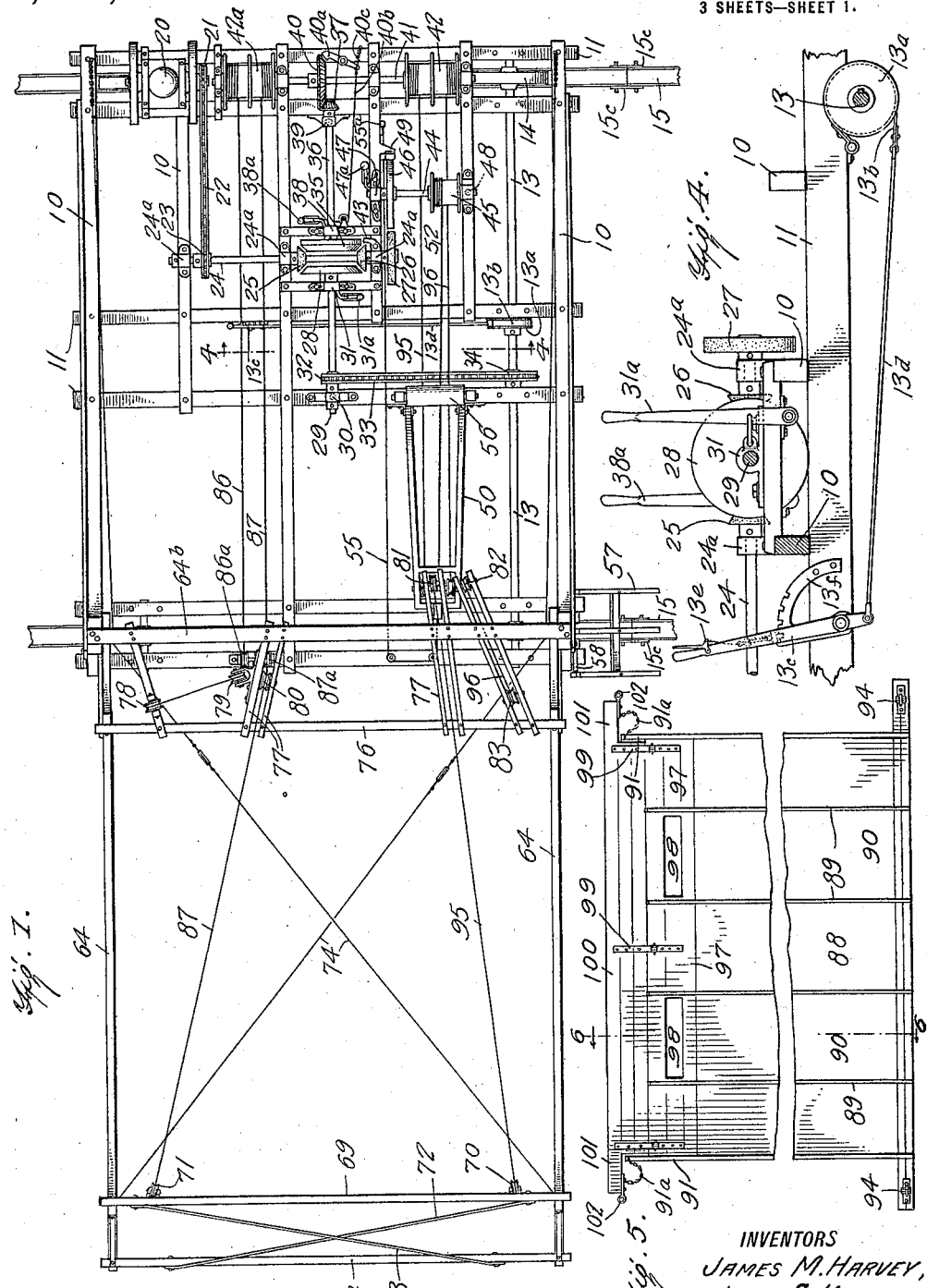

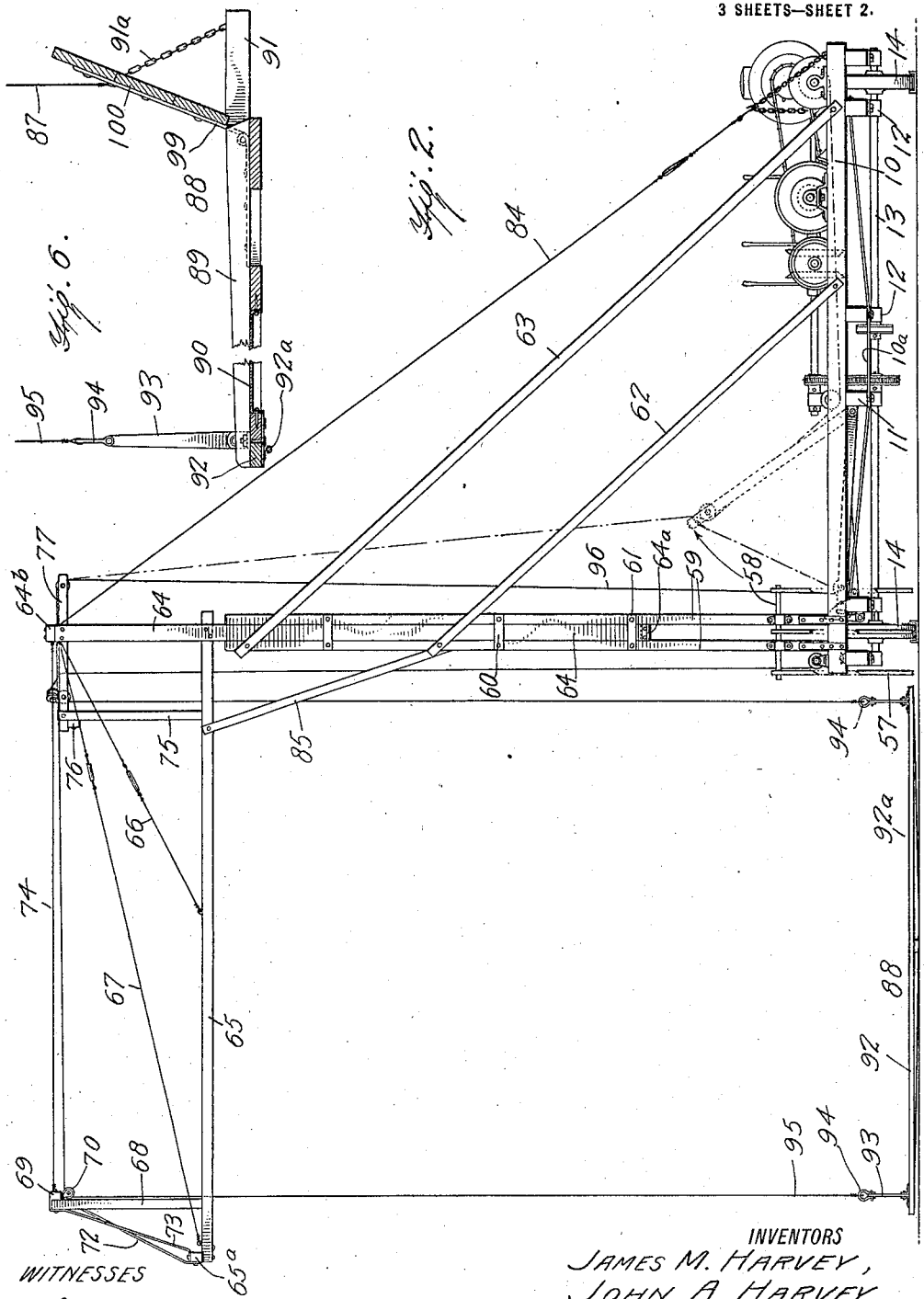

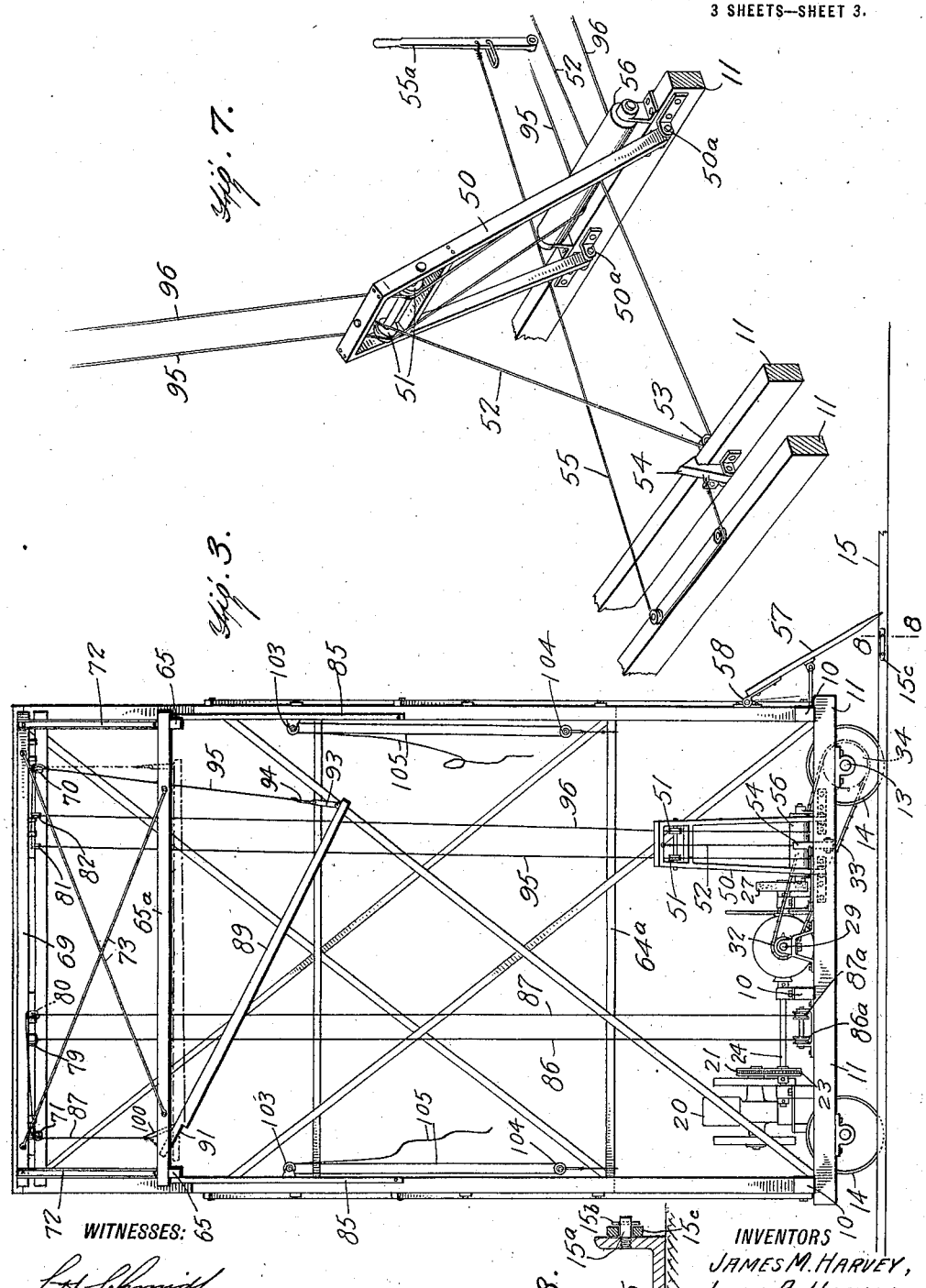

JAMES M. HARVEY AND JOHN A. HARVEY, OF OGDEN, KANSAS.

HAY AND GRAIN STACKER.

1,179,181.   Specification of Letters Patent.   Patented Apr. 11, 1916.

Application filed April 23, 1915. Serial No. 23,485.

*To all whom it may concern:*

Be it known that we, JAMES M. HARVEY and JOHN A. HARVEY, citizens of the United States, and residents of Ogden, in the county of Riley and State of Kansas, have invented certain new and useful Improvements in Hay and Grain Stackers, of which the following is a specification.

Our present invention relates generally to stackers for hay, grain, straw, leaves, and the like, and more particularly to certain improvements upon and in connection with the hay and grain stacker described and claimed in our Patent Number 1113988, dated October 20, 1914, our object being to simplify the construction, arrangement, and operation in our patented invention and to promote greater strength, efficiency, and durability in its use.

With the above in mind, the various improvements we have made, with their attending and consequent advantages, will be clearly understood by reference to the following description, in which the parts are clearly pointed out in the accompanying drawings, and in which drawings:

Figure 1 is a plan view of our improved stacker. Fig. 2 is front elevation. Fig. 3 is a side elevation. Fig. 4 is a detail vertical section taken through our improved stacker, substantially on line 4—4 of Fig. 1. Fig. 5 is a plan view of the jointed platform. Fig. 6 is a sectional view taken through the jointed platform substantially on line 6—6 of Fig. 5. Fig. 7. is a detail perspective view of certain parts including the tripping frame to be hereinafter specifically referred to, and Fig. 8 is a detail sectional view taken through one of the connections between track sections, substantially on line 8—8 of Fig. 3.

Referring now to these figures, it will be seen that as in our patent above referred to, the main traveling frame of our improved stacker, which is rectangular and disposed horizontally, consists of a number of cross beams 10 and longitudinal beams 11, secured together and strengthened by truss rods 10$^a$. Mounted through bearings 12 beneath the beams 11, is a transverse wheel shaft or axle 13 carrying the wheels 14, the latter engaging the track 15 which rests upon the ground or any other suitable supporting surface, and the sections of which, as particularly shown in Fig. 8, may be provided adjacent their ends with laterally and outwardly projecting studs 15$^a$, threadedly engaged therewith, and apertured for the reception of cotter pins 15$^b$, these studs being adapted to extend through apertures in fish plates 15$^c$ extending upon opposite sides of the track sections for the purpose of connecting the same in such manner that they may be readily disconnected and shifted from place to place.

In our present improvement it will be noted that the winding drums are all located along the right hand side of the main horizontal frame, and to this end the engine 20 which is supported at the right hand side of the frame adjacent its rear end, and which is movable bodily therewith, is provided with a driving sprocket 21, and from this sprocket a chain 22 extends to another sprocket 23, the latter sprocket being mounted rigidly upon a revoluble countershaft 24, spaced to the left of, and arranged parallel with, the shaft of the engine 20.

The countershaft 24 which is revolubly mounted in bearings 24$^a$ upon certain of the cross beams 10, is provided intermediate its ends with a pair of spaced facing bevel friction members 25 and 26, and is also provided at one end with a friction wheel 27, these several friction elements being rigidly secured upon the shaft.

A beveled friction wheel 28 is rigidly secured to one end of a revoluble shaft 29 which is pivotally mounted at its opposite end in bearing 30 to permit the said shaft to swing in a horizontal plane, said shaft extending through a laterally movable bearing 31 adjacent the friction wheel 28, which bearing may be adjusted by means of a hand lever 31$^a$ so as to swing the shaft upon its pivot bearing 30 and effect engagement between its friction wheel 28 and either of the friction members 25 and 26 of the countershaft, dependent upon the direction of adjustment of the shaft. To the shaft 29 is rigidly secured a sprocket wheel 32, connected by a sprocket chain 33, to a sprocket wheel 34 secured upon the wheel shaft or axle 13, which as before stated carries the traction wheels 14. The necessary motion for bodily transferring the entire apparatus from place to place upon the tracks 15, may thus be transmitted from the countershaft 24 to the wheel shaft or axle 13, the direction of rotation of the latter being dependent upon the direction of adjustment of shaft 29, as just described.

A bevel friction wheel 35 which is disposed between the friction members 25 and 26 upon the relatively opposite side of countershaft 24 from friction wheel 28, is secured upon the inner end of a shaft 36, generally alined with the shaft 29 before mentioned, and provided upon its opposite end with a bevel gear 37, shaft 36 being pivoted adjacent its latter end in a bearing 39 to swing in a horizontal plane and permit its friction wheel 35 to be engaged with, and disengaged from, the friction member 25, a sliding bearing 38 adjacent friction wheel 35, controlled by a lever 38$^a$, accomplishing this adjustment.

The gear wheel 37 at the outer end of shaft 36 is in constant mesh with a similar bevel gear wheel 40 intermediate the ends of a shaft 41 upon the ends of which are secured the winding drums 42 and 42$^a$. Thus the friction wheel 35 is shiftable into engagement with the friction member 25 of the countershaft, but in its opposite movement friction wheel 35 is engageable with a stationary brake piece 43 which prevents its engagement with the friction member 26 of the countershaft. When in engagement with friction member 25, friction wheel 35 transmits rotation to the drum shaft 41 to effect rotation of the drums 42 and 42$^a$ in the desired direction. An intermediately pivoted brake pawl 40$^a$ is adapted for engagement with the cogs of the gear wheel 40 under the effect of a spring 40$^c$, and is connected by a flexible connection 40$^b$ with the lever 38$^a$ so that movement of said lever, to bring wheel 35 in contact with brake 43, releases pawl 40$^a$ from gear 40 an instant before said wheel comes into contact with said brake.

Friction wheel 27 is adapted for engagement with a friction wheel 46 mounted upon one end of a horizontally shiftable shaft 44 extending at right angles to the shafts 29 and 36, and parallel with, and at one side of, the countershaft 24, shaft 44 having its pivot in a bearing 48 at its opposite end, and having a laterally shiftable bearing 47 movable by means of a lever 47$^a$. On this shaft 44 is secured a winding drum 45 which receives rotation when the friction wheel 46 is shifted into engagement with the friction wheel 27. When friction wheel 46 is shifted in the opposite direction, however, it comes into engagement with a stationary brake piece 49 which effectively retards rotation thereof.

The wheel shaft or axle 13 may be provided with a pulley 13$^a$, controlled by a band brake 13$^b$, the latter being operated from a hand lever 13$^c$ connected thereto by a connecting rod 13$^d$, lever 13$^c$ having a latch mechanism 13$^e$ in engagement with the notched quadrant 13$^f$ on one of the longitudinal beams 11 of the frame as clearly seen by reference to Figs. 1 and 4.

Hinged to the most centrally located beam 11 of the main frame, as will be seen by reference to Figs. 1 and 7, is a trip frame 50, the hinges 50$^a$ of which are such as to permit this frame to swing vertically moving its free end toward and away from another longitudinal beam 11, this latter beam being provided with a pivoted latch member 54 engageable with the free end of the trip frame 50 to lock the latter in horizontal position. Adjacent its free end the trip frame 50 is provided with a pair of pulleys 51 upwardly beneath which extend the flexible connections 95 and 96, connected at one end to the elevating platform in a manner to be hereinafter described, and having their opposite ends extending beneath a roller 56, journaled upon the beam 11 to which trip frame 50 is pivoted, and extending laterally to the drum 42 as will be clearly seen by reference to Fig. 1.

Connected to the free end of the trip frame 50 is one end of a flexible connection 52, passing beneath a roller 53, and from thence to the drum 45, by which means the free end of the trip frame 50 may be drawn downwardly to a horizontal position, from the position shown in Fig. 7, to permit engagement of the latch 54 therewith, this latch being releasable when it is desired, by means of a flexible connection 55 secured at one end thereto and having its opposite end secured to a controlling lever 55$^a$.

At the front of the machine is a small fork 57 which serves as a pilot for sweeping scattered hay or other material from the adjacent track 15, this pilot being connected by a pivot 58 with the main frame as best seen by reference to Figs. 1 and 3.

Extending upwardly from the side of the main frame opposite to that upon which the drums are mounted, are beams or posts 59, spaced and braced apart by ties 60 and 61 and together with the latter, constituting a vertically disposed slideway of considerable height. Connected with the upper portion of this slideway and extending obliquely downward therefrom to certain of the beams 10, are braces 62 and 63 which serve to hold the slideway firmly in position. A vertical sliding frame 64 is mounted in this slideway and is adjustable therein to different elevations, this sliding frame being provided with a bottom bar 64$^a$ and with a top bar 64$^b$, and supporting a pair of extending rails 65 projecting horizontally away from the main frame at one side thereof. Bracing rods 66 and 67 extend from the top of the sliding frame 64 to the rails 65 and serve to support the latter at their outer ends.

The extending rails 65 support near their outer ends, the uprights 68 which are connected at their upper extremities by a bar 69 which bar in turn supports pulleys 70 and 71. The uprights 68 and bar 69 are firmly held in place by means of braces 72 and 73 and further supported by crossed stay wires 74. The rails 65 also support inner uprights 75 which are connected at their upper extremities by a bar 76, this bar 76 together with the top bar 64$^b$ of the sliding frame, supporting a series of short parallel bars 77 in which are disposed pulleys 78, 79, 80, 81, 82, and 83. The pulleys 78 and 79 are guides for one of the flexible connections 86 extending from hoisting drum 42$^a$ and passing upwardly over a pulley 86$^a$ carried by the main frame. The pulley 80 is a guide for the flexible connection 87 also extending from hoisting drum 42$^a$ and upwardly over a pulley 87$^a$ carried by the main frame, it being noted from Fig. 1 that this flexible connection 87 also extends over the pulley 71 carried by the outer cross bar 69 before mentioned.

The pulley 81 serves as a guide for the flexible connection 95 before mentioned, which also passes over pulley 70 carried by the outer cross bar 69 before mentioned, and pulleys 82 and 83 are guides for the flexible connection 96 before mentioned, it being remembered that the flexible connections 95 and 96, passing as they do upwardly beneath the pulleys 51 of the trip frame 50, are susceptible of change in their respective lengths at any time by a release of the trip frame 50, by manipulation of the latch member 54 to released position, for a purpose to be now described.

The diagonal braces 85 brace the rails 65 from the frame 64, and the adjustable guy rods 84 support and brace the upper extremity of the frame 64 from the main frame.

Referring now to the jointed elevated platform 88, particularly shown in Figs. 5 and 6, and which is used for temporarily retaining the material to be operated upon in order to lift this material to the proper height and to deposit it upon the stack, it will be seen to consist in our patent before referred to, of a number of longitudinal sills or ribs 89 upon which the material to be operated upon, may be raised directly. A number of webs 90 of sheet metal are extended between these sills 89 and secured thereto, these webs being useful in preventing the dropping of fragmentary portions of hay or other material. The two outermost sills 89 are provided with rearwardly extending portions 91, and the front ends of all of the sills are secured to a bar 92 braced by a truss rod 92$^a$. Mounted upon this bar at its extremities are straps 93 carrying curvatures 94 to which the hoisting connections 95 and 96 are attached.

Abutting the webs 90 before mentioned, and which may or may not be used, are shorter webs 97, two of these latter webs being provided with openings 98 for the purpose of receiving the wheels of a push rake as the latter is driven onto the elevating platform upon the ground. Connected with these webs 97 are hinges 99 and carried by these hinges is the rear portion 100 of the elevating platform, which may, by means of the said hinges, be tilted relatively to the body of the platform, under suitable conditions, so as to assume the position indicated in Fig. 6. The degree of inclination which the rear portion 100 of the elevating platform may assume relatively to the general plane of the body thereof, is limited, however, by chains 91$^a$ which connect the rearwardly extending portions 91 of the two outermost sills 89 before mentioned, with the extending portion 101 of the rear hinged portion 100 just mentioned. The rear portion 100 of the elevating platform 88 is provided at its ends with extending portions 101 carrying rings 102 to which the elevating connections 86 and 87 are secured, whereby the rear portion of the elevating platform is normally sustained.

For the purpose of raising and lowering the sliding frame 64 in order to adjust the height of the rails 65 and the parts associated therewith from the ground, we provide pulleys 103 and 104 together with the cords 105, pulleys 103 being secured upon the stationary framework and pulleys 104 being connected with the bottom rail 64$^a$ of the vertical sliding frame.

Assuming the machine to be in its normal position ready for operation with the jointed elevating platform 88 resting flat upon the ground as shown in Fig. 2, the method of operation is as follows: The hay or other material having been previously loaded upon a push rake propelled by horses, the push rake is driven out upon the jointed platform so that the wheels of the push rake enter the openings 98 in the floor of the jointed platform, thus insuring precision in the position of the rake relatively to the platform, and by offering resistance at the instant of starting to back the wheels, this construction greatly assists the automatic push-off of the modern rake in entirely freeing itself of the whole load in one compact mass. The rake having been backed off so as to leave the load resting upon the elevating platform, it will be found that by thus depositing the materials upon the platform, they are arranged with more or less semblance of system, the straws or stems lying crosswise of the sills of the platform, and our design is such that this arrangement of material is maintained in depositing all loads upon the stack from bottom to top regardless of its length.

The rake having been backed off and clear of the platform, the operator seated conveniently upon the main frame to the several hand levers, grasps the lever 38ª and, by moving the same, brings the friction wheel 35 in contact with the friction member 25, thus causing drums 42 and 42ª to rotate and raise the elevating platform vertically in a horizontal position upward from the ground, it being understood that the engine 20 is running at this time. In doing this the rear portion 100 of the jointed elevating platform 88 is tilted as indicated in Fig. 6, and any fragmentary portions of the load that may have been left on this portion of the platform, are deposited on the body thereof, and this feature together with the ample size with which it is practical to construct a power operated elevating platform, saves the operator much time and labor which are ordinarily expended in placing loads on stackers. When the load reaches the desired height, the wheel 35 is thrown out of contact with the wheel 25, the drums 42 and 42ª thus ceasing to rotate, and the instant this is done, the pawl 40ª engages the cogs of the bevel gear 40 to hold the platform stationary and in elevated position. The operator now moves the lever 31ª, bringing the friction wheel 28 into contact with the friction member 25, causing the machine to move forwardly along the track 15 to the point at which it is desired to deposit the load. When this point is reached, the operator again moves lever 31ª to disengage friction wheel 28 from the friction member 25, so that the body movement of the apparatus is discontinued, and at this time the brake 13ᵇ may be set.

To dump the load the operator moves lever 55ª to release the latch 54, thus freeing the trip frame 50 which at once moves upwardly to the position shown in Fig. 7 under the weight of the load, thus changing the effective length of the hoisting connections 95 and 96 supporting the forward end of the elevating platform, so that this forward end of the elevating platform is free to lower and release the load upon the stack. As soon as this is done, the operator moves lever 47ª to bring friction wheel 46 in engagement with the stationary brake piece 49 in order that the releasing of the trip frame may be effected without jerking strain upon the main frame of the machine. This may be done by attaching the flexible connection 55 controlling the latch piece directly to the lever 47ª to release the latch member just before the friction wheel 46 comes into engagement with its brake stop. The operator again by means of lever 47ª brings the wheel 46 into contact with the wheel 27, thus causing the drum 45 to rotate and wind up the cable 52 until the trip frame 50 is again drawn downwardly to latched position. The operator then by means of lever 31ª, brings the wheel 28 in contact with the wheel 26 and the power now transmitted from the engine through the countershaft to the wheel shaft 13, causes the machine to bodily travel in an opposite direction and back to the position which it originally occupied. Through action of the lever 38ª, the operator at one movement releases the pawl 40ª from the gear 40 and brings the wheel 35 in contact with the stationary brake piece 43, and when the elevating platform has been in this way lowered to the ground, the foregoing operation may be repeated.

Thus by the improved construction, we have clearly shown and described, we have succeeded in doing away with the complicated latch mechanism and tripping parts associated with the elevating frame 64 and its equivalent parts in our patent referred to, and in fact, considerably simplified in material respects, the construction, arrangement, and operation shown in that patent. The advantages arising from a simplified construction, and from the promotion of increased strength and durability, are important ones in a machine of this type and well adapted to insure its practical success. It is to be understood, however, that even as thus improved in a structural way, our invention is susceptible of various changes and modifications without departing from the spirit thereof, and without departing either from the claims in connection with our patent before referred to, and the appended claims, and we wish therefore, to be understood as reserving all such changes and modifications as fall within the purview thereof.

We claim:—

1. A stacker comprising a traveling framework, an elevated supporting member, a platform movable vertically in relation to said supporting member, flexible connections for raising and lowering said platform, a trip frame pivoted at one end in the framework and movable to change the effective length of certain of said connections, said trip frame having pulleys beneath which the said flexible connections extend, a latch engageable with the free end of the said trip frame to normally hold the same in horizontal inoperative position, and means under control of the operator for releasing the said latch, said means including a lever having flexible connection with the latch.

2. A stacker comprising a traveling framework, an elevated supporting member, a platform movable vertically in relation to said supporting member, flexible connections for raising and lowering the said platform, a trip frame movable to change the effective length of certain of said flexible connections and having pulleys around which said flexible connections pass, means for normally holding said trip frame in inoperative position, and means under control of the operator for releasing the trip frame.

3. A stacker comprising a traveling framework, an elevated supporting member, a platform movable vertically in relation to said supporting member, connections for raising and lowering said platform, a trip member movable to change the effective length of certain of said connections whereby to permit of tilting of the platform, and means controlled by the operator for tripping said member.

4. A stacker comprising a traveling framework, an elevated supporting member, a platform movable vertically in relation to said supporting member and provided with a plane portion and with a tilting portion movably connected with said plane portion, connections for raising and lowering said platform, and means interposed within certain of said connections whereby to cause sudden change in their respective lengths and permit of tilting of the platform.

5. A stacker comprising a traveling framework, an elevated supporting member, a platform movable vertically in relation to said supporting member, a hoisting mechanism including flexible connections extending over and downwardly from the said supporting member and attached to the said platform, and means interposed within certain of the said flexible connections and releaseable to cause sudden change in their effective lengths and permit of tilting of the platform.

6. A stacker comprising a traveling framework, an elevated supporting member, a platform movable vertically in relation to said supporting member, connections for raising and lowering said platform, and means interposed within certain of the said flexible connections whereby to cause sudden change in their effective lengths and permit of tilting of the platform.

7. A stacker comprising a traveling carriage, a framework or tower mounted on said carriage, horizontal rails supported by said framework and which extend at right angles to the path of travel of said carriage, a superstructure carried by said rails and provided with guide pulleys, a hoisting mechanism including a plurality of flexible connections extending over said pulleys, a jointed platform movable vertically by said hoisting mechanism, and a trip member operating on certain of said flexible connections to vary their effective length so as to tilt said jointed platform in the direction of travel of said carriage and at points lateral to said path of travel.

8. A stacker comprising a traveling framework, an elevated supporting member, a platform movable vertically in relation to the said supporting member, flexible connections for raising and lowering said platform, a trip frame pivoted at one end in the framework to swing in a vertical plane, said trip frame having pulleys adjacent its free end beneath which certain of the flexible connections extend, a latch pivoted in the framework and engageable with the free end of the trip frame in horizontal position, power operated connections for throwing the free end of the trip frame downwardly to horizontal latched position, and means under control of the operator for releasing the latch to permit the trip frame to rise and change the effective length of the flexible connections controlled thereby.

JAMES M. HARVEY.
JOHN A. HARVEY.

Witnesses:
L. A. FERGUSON,
FRED YAUNKIN.

Copies of this patent may be obtained for five cents each, by addressing the "Commissioner of Patents, Washington, D. C."